Figure 1:
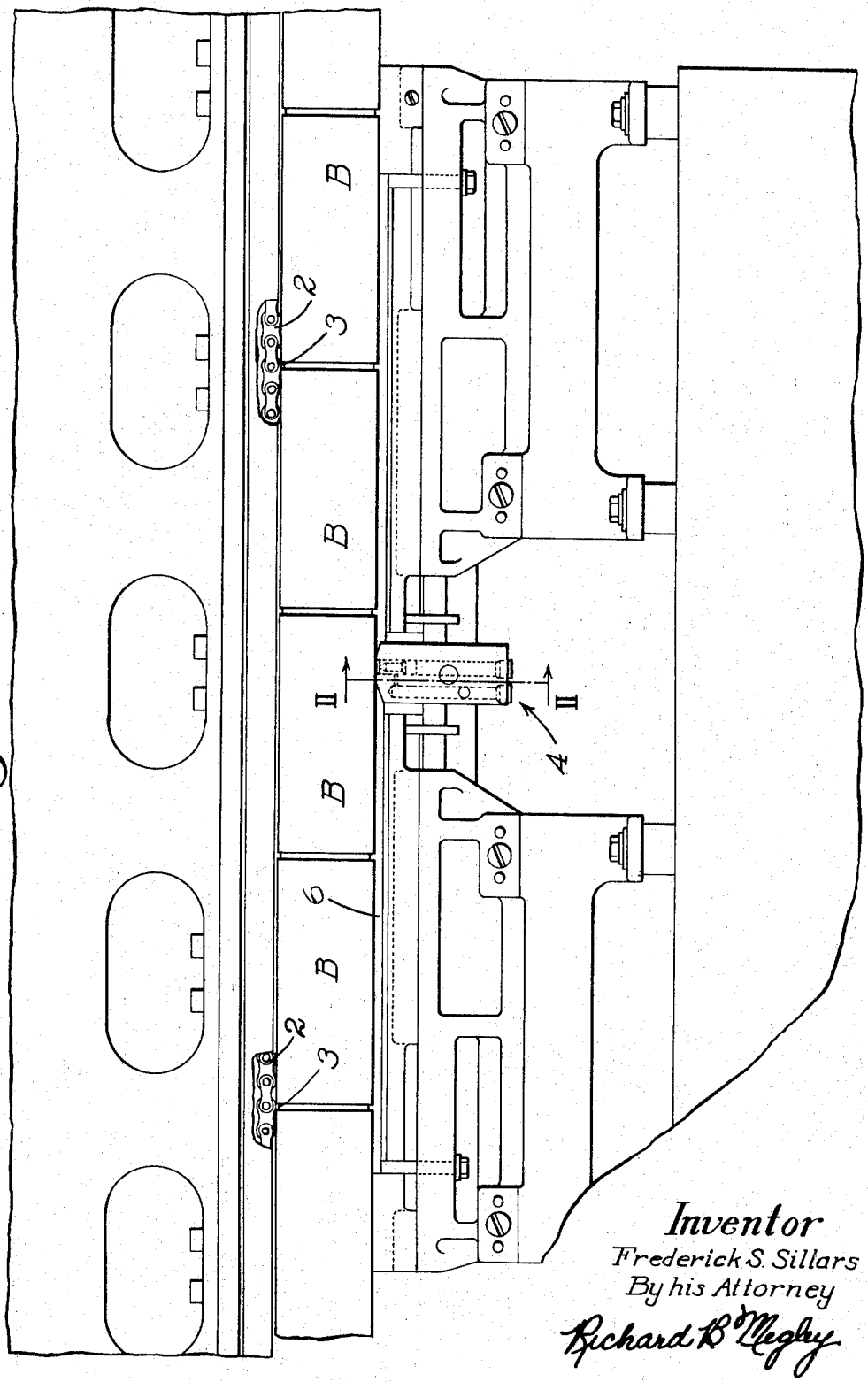

March 5, 1968

F. S. SILLARS 3,371,838

SOLDER APPLICATORS

Filed Dec. 13, 1965

2 Sheets-Sheet 1

Inventor
Frederick S. Sillars
By his Attorney
Richard B. Megley

March 5, 1968

F. S. SILLARS 3,371,838

SOLDER APPLICATORS

Filed Dec. 13, 1965

2 Sheets-Sheet 2

United States Patent Office 3,371,838
Patented Mar. 5, 1968

3,371,838
SOLDER APPLICATORS
Frederick S. Sillars, Beverly, Mass., assignor to United Shoe Machinery Corporation, Boston, Mass., a corporation of New Jersey
Filed Dec. 13, 1965, Ser. No. 513,259
9 Claims. (Cl. 228—43)

This invention relates to apparatus for soldering can bodies and, more specifically, to an improved applicator or nozzle for applying solder to the side seams of "tin" cans. The conventional method of forming a tin can is to bend a sheet of metal into a tube and interlock its edges to form a side seam or longitudinal seam joint of interlocked layers. It is to these layers that solder must be applied to seal the side seam. Apparatus including an applicator or nozzle for applying solder to a can formed in the manner just described is disclosed in applicant's United States Patent No. 3,190,528, issued June 22, 1965. The present invention relates to an improved applicator or nozzle for use with apparatus of the type disclosed in the referenced patent.

Solder applicators of the type disclosed in the referenced patent generally comprise a rigid body having a passageway through which solder is fed from a solder pot to a discharge orifice. Solder is projected from the discharge orifice of the applicator to the side seam of a can body passing thereabove. The solder pot normally has adjusting means for controlling the height of molten solder in the pot. Means are also generally provided for continuously feeding bars of solder into the pot. The applicator is placed in close proximity to the path of movement of the side seams of can bodies passing thereabove in order to assure uniform continuous disposition of solder. In addition to the low trajectory solder discharge passageway disclosed in the referenced patent, a vertical or high trajectory passageway frequently is employed.

A low trajectory discharge passageway is so oriented that solder is discharged from its orifice with a trajectory the apex of which coincides with the path of movement of the side seam of can bodies moving past the applicator. A vertical or high trajectory passageway, however, projects solder directly upwardly into a side seam located thereabove. When a vertical or high trajectory discharge passageway is used, a shield member such as a roll is employed to prevent solder from squirting through the gaps that normally exist between adjacent can bodies being conveyed past the solder applicator.

Can bodies introduced to side seam soldering machines of the referenced type are initially moved along ceramic guide rails while the side seam is preheated, preferably by an induction heating coil. The heating affects not only the metal portion of the can body forming the side seam but also flux which was previously applied. Flux is applied to the margins of the sheets of metal from which can bodies are formed prior to their being interlocked in a bodymaker. As a result, flux vapors are produced when the side seam is pre-heated. These flux vapors, together with the flux in the liquid or solid phase which escapes from the side seam, frequently cause clogging of the discharge orifice of the applicator when can bodies are conveyed thereabove. In fact, clogging is essentially an inevitable result; the only question being the time required for the applicator to become inoperative.

Clogging occurs as a result of a number of chemical reactions initiated by the flux. Flux contacts solder discharged from the applicator and reacts with oxides in the solder and forms oxide deposits on the applicator. Flux components, particularly those of an organic nature, condense or otherwise lodge around the orifice and carbonize under the influence of heat. Uncarbonized flux deposits in the orifice also cause clogging. Applicators having a vertical or high trajectory discharge passageway are particularly susceptible to clogging of this type.

Heretofore, the velocity of solder discharge from a particular applicator was variable only by intermittent control of the head or height of molten solder in the solder pot. Control of velocity was not always exact and relatively minute adjustment could not readily and precisely be made. Since the velocity of discharge relates directly to the trajectory and quantity discharged its control is of prime importance in the operation of a side seam soldering machine.

Applicant has invented apparatus for creating a gaseous envelope which prevents clogging of the discharge orifice resulting from the presence of flux or other foreign matter. Control of pressure within the envelope permits adjustment in the velocity of the discharged solder stream.

Accordingly, it is an object of the present invention to provide a solder applicator having means for creating an envelope of gas under positive pressure around the applicator orifice and solder discharged therefrom whereby to prevent clogging of the orifice.

It is a further object of this invention to provide a solder applicator having means for readily adjusting the velocity of solder discharge therefrom.

To these ends and in accordance with a feature of this invention there is provided in a machine for applying solder to the side seams of moving can bodies, an applicator comprising a body portion having a solder passageway therein, a nozzle member mounted in said solder passageway displaced from the discharge end thereof, and means for creating an envelope of pressurized gas around solder discharge from the nozzle and the discharge end of the solder passageway. Means may also be provided for varying the pressure within the gaseous envelope.

The above and other features of the invention including various novel details of construction and combinations of parts will now be more particularly described with reference to the accompanying drawings and pointed out in the claims. It will be understood that the particular embodiment of the invention is shown by way of illustration and not as a limitation of the invention. The principles and features of this invention amy be employed in varied and numerous embodiments without departing from the scope of the invention.

Figure 2:
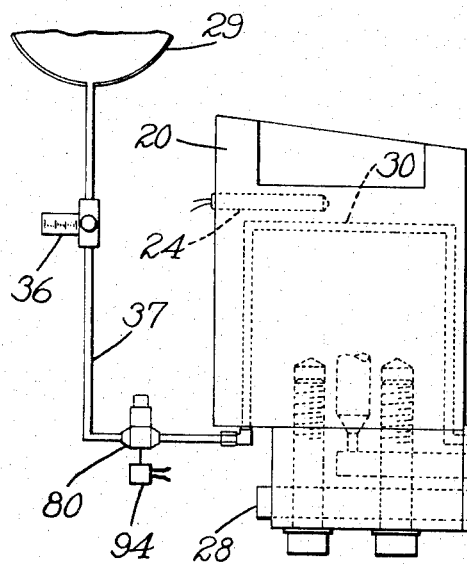
Figure 3:
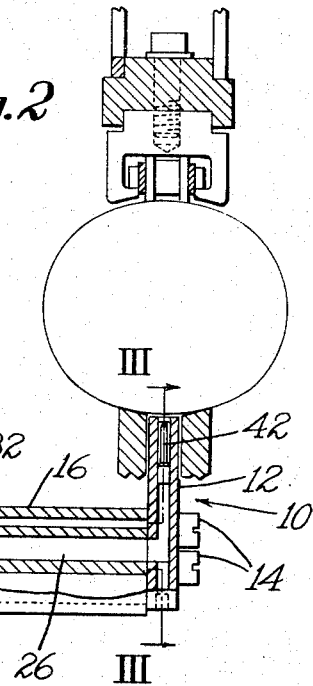
Figure 3:
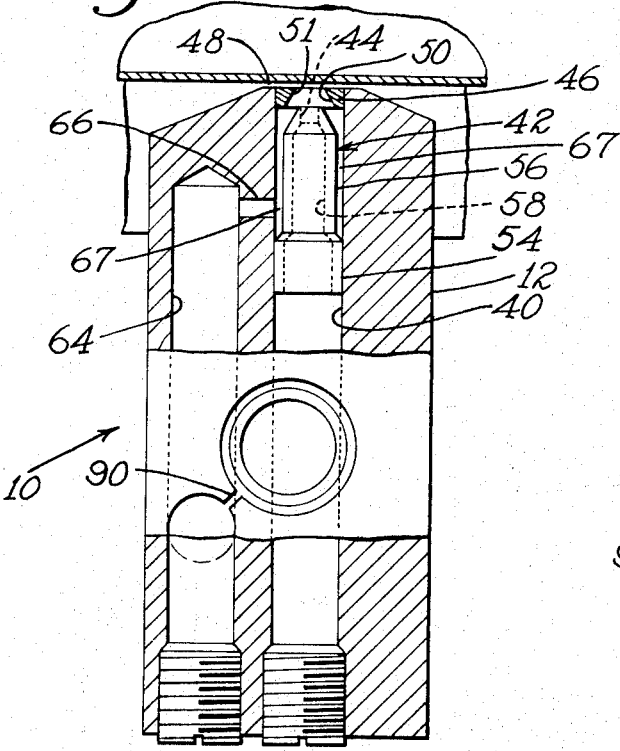
Figure 4:
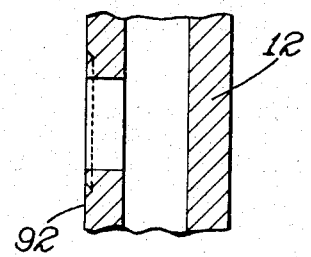

In the drawings:
FIG. 1 is a side elevation of a can body soldering machine embodying the invention;
FIG. 2 is a sectional view on an enlarged scale taken along the line II—II of FIG. 1;
FIG. 3 is a sectional view on an enlarged scale taken along the line III—III of FIG. 2; and
FIG. 4 is a sectional view on an enlarged scale of a portion of the solder applicator illustrated in FIGS. 2 and 3.

FIG. 1 shows can bodies B which were formed in a body-maker of any conventional type, not illustrated, being conveyed from left to right in a timed and spaced order by a machine having an endless chain 2 and feed dogs 3 located at predetermined, spaced intervals. Each dog 3 is engageable with the trailing edge of one can body, the spaces between adjacent can bodies being equal to the length of the dogs. The bodies are conveyed past a soldering station 4 which constitutes the locus of this invention. Prior to reaching the soldering station the moving can bodies are heated by any convenient means, as for example, an induction heater 6. As noted above, this preheating operation produces flux vapors when the temperature of the previously applied flux in the side seam area is elevated above its boiling point. Transfer of additional heat to the flux vapors results in expansion and a correlated pressure increase with the result that flux vapors are urged or forced out of the side seam to be deposited on adjacent portions of the machine. The increase in pressure on the flux also tends to disassociate certain of the flux remaining in the solid or liquid phase from the side seam whereby it too escapes and is deposited on portions of the machine in its path of escape. Accordingly, unless means are provided to direct escaping flux away from the solder discharge passageway of the applicator it will become clogged by a build up of carbonized flux and flux oxide deposits, etc. As hereinafter described in greater detail, a buffer zone or envelope of protective air or other gas is formed in and around the discharge passageway and its orifice as well as the solder discharged therefrom when the applicator of the subject invention is used. This gaseous buffer zone or envelope is supplied under a positive, variable pressure and, thus, prevents deposit of foreign material in the discharge passageway and its orifice area.

The soldering station 4 includes a non-yieldable, rigid solder applicator 10 having a unitary body 12 which is secured by screws 14 to an arm 16 (FIG. 2) extending from the bottom of a solder reservoir 20. The reservoir 20 includes adjusting means, not shown, for controlling the height of molten solder and means for continuously feeding bars of solder to the reservoir whereby the pressure head of molten solder is maintained at a predetermined level. Solder in the reservoir 20 is maintained in a molten state during operation of the machine by heaters (not shown) located in each corner of the reservoir. Also inserted in the reservoir is a thermostatic unit 24 (FIG. 2), which through appropriate control mechanism, not shown, maintains the temperature of the heaters and consequently of the reservoir and its contents at a predetermined temperature. Solder flows from the reservoir 20 through the arm 16 in a horizontal passageway 26 which is maintained at a constant predetermined temperature by a resistance heater 28.

Air or another preferred gas used to create the buffer zone or envelope discussed above, is supplied from a pressurized storage tank 29 of any convenient type. Gas flows from the storage tank into a circuitous passageway 30 in the sidewall of the reservoir 20. In the embodiment illustrated, the passageway 30 is essentially of inverted U configuration. Gas flowing through the passageway 30 is heated by heat transferred from the molten solder in the reservoir 20 and from the heaters located in the corners of the reservoir. Pre-heating of the gas is desirable in order to ensure a temperature differential between solder discharged from the applicator and the gaseous envelope which does not result in solidification of the discharged solder. Accordingly, the path of the passageway 30 is inconsequential so long as it allows adequate exposure of the gas to the heat of the solder and heaters. Gas flows from the passageway 30 through the arm 16 in a horizontal passageway 32. The rate of flow and pressure of the gas is controlled by a valve 36 in the line 37 linking the storage tank 29 to the passageway 30.

The body 12 of the applicator 10 has a solder passageway 40 in which a solder discharge nozzle 42 having a discharge orifice 44 is force fit. The solder passageway 40 communicates with the passageway 26 in the arm 16. A baffle washer 46 is force fit into the upper, open end of the passageway 40 with the upper surface of the washer 46 coincident or "flush" with the upper surface 48 of the body 12 of the applicator. The baffle washer 46 has a centrally located aperture 50 in the form of an upright truncated cone. The smaller end 51 of the aperture 50 is larger than the solder discharge orifice 44 to permit unobstructed passage of solder discharged from the nozzle 42 through the washer 46, as discussed in greater detail hereafter.

The nozzle 42 comprises a lower, annular portion 54 having an initial outside diameter slightly in excess of the diameter of the passageway 40 to provide the interference necessary for a force or shrink fit. The main body 56 of the nozzle 42 has an outside diameter less than that of the passageway 40. A central passageway 58 in the nozzle 42 communicates with the discharge orifice 44. The nozzle 42 is preferably positioned in the passageway 40 with its upper end lying in the same plane as the lower surface of the baffle member 46.

The lower end of the passageway 40 is closed by a plug 60. The passageway 40 may be easily and completely cleaned by removing the plug 60, nozzle 42 and baffle washer 46 to permit the insertion of a cleaning tool through the entire extent of the passageway 40.

The body 12 of the applicator 10 is also provided with a gas passageway 64. The passageway 64 communicates with the gas passageway 32 in the arm 16, and is linked to the upper end of the passageway 40 by a horizontal passageway 66. It should be noted that passageway 66 intersects the passageway 40 above the preferred location of the annular portion 54 of the nozzle 42. Alternate positioning of the nozzle 42 is limited by the requirement that the annular portion 54 be located below the passageway 66 whereby gas fills the void 67 between the portion 54 and the wall of the passageway 40. The lower, open end of the passageway 40 is closed by a plug 70.

A side seam soldering machine of the type described is initially prepared for use by placing bars of solder in the reservoir 20 and activating the reservoir heaters to melt the solder bars. Conventional valve means (not shown) are employed to prevent the flow of solder until it has attained a prescribed temperature level. When the solder has reached the prescribed temperature as registered on the thermostatic unit 24, molten solder is thereafter allowed to flow by the conventional valve means which are actuated in response to the reading on the thermostatic unit. Solder thereafter flows through the passageways 26 and 40 and is discharged from the nozzle 42 through its orifice 44. The stream of discharge solder passes through the aperture 50 in the washer 46 and is deposited in the side seam of a can body passing thereover.

The flow of gas within the passageways 30, 32, 64 and 66 is also initiated in response to the elevation of the solder to a prescribed temperature level. However, since it is normally desirable to initiate the flow of gas prior to the flow of solder, the temperature at which the flow of gas commences is lower than that for solder flow. The desirability of initiating gas flow first will become evident in the discussion which follows. Accordingly, when the temperature of the solder has reached a predetermined level as registered on the thermostatic unit 24, a solenoid valve 80 is actuated by conventional means associated with the thermostatic unit to permit the flow of gas from the pressurized storage tank. The pressure and rate of flow of gas may be adjusted by use of the valve 36. As noted above, the temperature at which the solenoid 80 is actuated to permit the flow of gas is generally lower than the temperature at which solder flow starts.

When the solenoid valve 80 is opened, gas under a positive pressure passes from the storage tank into the passageway 30 in the wall of the reservoir 20 where it is heated as discussed above. The heated, pressurized gas thereafter passes through the passageways 32, 64 and 66 into the passageway 40 above the annular portion 54 of the nozzle 42. The gas fills the essentially annular cavity or void 67 formed between the outer surface of the main body portion 56 of the nozzle 42 and the wall of the passageway 40 and flows through the aperture or orifice 50 under a positive pressure. The aperture 50 acts as a flow nozzle on the gas flowing therethrough. The annular cavity 67 and aperture 50 may be purged of foreign particles prior to solder flow by raising the pressure of the gas. A pressure of approximately 10 p.s.i.g. is normally adequate to remove loose particles. The operating gas pressure is normally lower than 10 p.s.i.g. and, thus, the valve 36 must be adjusted to lower the gas pressure prior to solder flow.

When solder flow is initiated and solder discharged through the orifice 44 in the nozzle 42 in the manner described above, the stream of solder is enveloped by gas in its passage through the aperture 50 and for a substantial part of its travel to the side seam of a can body. The solder flowing from the orifice 44 is under sufficient pressure and being denser than the pressurized gas displaces the pressurized gas in the passageway 40, aperture 50, and in the area above the applicator. The displaced gas does, however, form a pressurized envelope or buffer zone around a portion of the solder stream and the baffle washer 46 which prevents any flux escaping from the side seam from being deposited on or near the baffle washer. The upper boundary of the gaseous envelope is determined by the point of which the gas and flux vapor pressures are equal. That is, the gaseous buffer zone or envelope will extend above the applicator to a point where the flux vapor pressure and reduced gas pressure are the same. The pressurized gas envelope is thus of more than sufficient size to prevent flux from clogging the aperture 50 and the orifice 44.

As noted above, can bodies are conveyed past the solder station 4 in spaced order by engagement of spaced feed dogs 3 on the chain 2 with the trailing ends of succeeding can bodies B. A gap or space between can bodies is thus established which has a minimum width equal to the length of the dogs. Passage of solder discharged from the orifice 44 through the gaps between can bodies is avoided when an essentially vertical or "high" trajectory discharge passageway such as nozzle 42 illustrated in FIGS. 2 and 3 is used by placing a shield member such as a roll at the location where the gaps between can bodies intersects the solder stream. The roll does, however, deflect certain of the solder in the direction of the baffle washer 46. The pressurized gas envelope or buffer zone prevents such deflected solder from being deposited in the area of the baffle washer 46, aperture 50 or discharge orifice 44.

The extent or boundaries of the pressurized gaseous buffer zone may be conveniently controlled by adjusting the pressure at which the gas passes through the passageways 30, 32, 62, 64 and 66 and, thus, the pressure within the buffer zone or envelope outside the applicator 10. That is, a rise in gas pressure moves the demarcation point at which the gas pressure is equal to the flux vapor pressure away from the applicator. Conversely, lowering the gas pressure reduces the size of the envelope. The gas pressure is conveniently controlled by adjustment of the valve 36 as discussed above.

The pressure of the gas flowing through the aperture 50 and the gas within the passageway 40 also influences the trajectory or height the solder stream is projected and the velocity of the solder stream. That is, the pressurized gaseous envelope essentially acts as a constrictor to the solder stream thereby not only regulating flow but maintaining the solder stream homogeneous and unwavering. The truncated conical aperture 50 essentially acts as the converging portion of a nozzle on the gas flowing through it. The influence of the aperture 50 on the gaseous envelope is transmitted directly to the solder stream flowing therethrough. The gaseous envelope essentially constitutes a "pipeline" or conduit for the solder stream. Gas flowing through the aperture 50 essentially acts as the converging area of a nozzle on the solder stream and the gaseous envelope outside the applicator essentially acts as the diverging portion of a nozzle. The size of the gaseous "pipeline" may be varied by adjusting the gas pressure by use of the valve 36. Thus, the velocity of the solder flow and height reached by the solder stream may be conveniently and precisely controlled by use of the valve 36.

Although air or another gas may be used in the applicator as described above, nitrogen gas is preferred in the embodiment illustrated in FIGS. 2-4. The nitrogen gas may also be used to seal the interface between the applicator 10 and arm 16 to prevent the formation of solder oxides therein and resultant "freezing" of these member together. To this end, a conduit 90 is provided which permits the flow of gas from the passageway 32 to an annular bearing cavity 92 which circumscribes the passageway 26 at the interface between the arm 16 and applicator 10. Thus, no gaskets are required at this junction point.

In the use of an applicator 10 of the type described, solder is introduced into the reservoir 20 in conventional manner, gas and solder are initiated in the manner described above; and the velocity of solder discharge is conveniently adjusted by use of the control valve 36 to accommodate a particular application. However, since the pressurized gas envelope prevents clogging of the aperture 50 and orifice 44 uninterrupted use of the applicator for an unlimited period now becomes a reality. This has not heretofore been possible.

Another advantage of this apparatus is that when it is desired to discontinue use of the applicator, the heaters in the reservoir 20 are turned off and the valve means associated with the flow of solder from the reservoir closed to stop solder flow, however, the flow of gas may be continued for a predetermined interval subsequent to the stoppage of solder flow to ensure that the passageway 40, orifice 44, and aperture 50 are purged of unused solder by means of a conventional timer 94 (FIG. 2) which controls the closing of the solenoid valve 80.

Having thus described my invention, what I claim as new and desire to secure by Letters Patent of the United States is:

1. An applicator for applying solder to the side seams of moving can bodies having means for discharging a stream of solder and means for surrounding said discharge means and said stream with an envelope of pressurized gas thereby to prevent clogging of said discharge means.

2. An applicator for applying solder to the side seams of moving can bodies having a main passageway terminating at a discharge end, a solder nozzle having a discharge orifice in close proximity to said discharge end of the main passageway, and means for introducing gas into said main passageway under a positive pressure thereby to create an envelope of pressurized gas around the discharge orifice of the nozzle, the discharge end of the main passageway and the solder discharged from the applicator.

3. An applicator for applying solder to the side seams of moving can bodies having a main passageway terminating at a discharge end, a solder nozzle located in the main passageway and having a discharge orifice spaced from the discharge end of said main passageway, said nozzle having a main body portion of lesser diameter than said main passageway and closely assembled to the walls of the main passageway below said main body portion thereby creating a space between the main body portion of the nozzle and the walls of the main passageway, a gas passageway communicating with said space at a location between the discharge orifice of the nozzle and its enlarged portion, and means for introducing gas under pressure to said space thereby to create an envelope of pressurized gas around the discharge orifice of the nozzle, the discharge end of the main passageway and the solder discharged from the applicator.

4. An applicator according to claim 2 and having means for varying the pressure of the gaseous envelope to control the flow of solder through said envelope.

5. An applicator according to claim 3 and having means for varying the pressure of the gaseous envelope to control the flow of solder through said envelope.

6. An applicator according to claim 3 and having means located at the discharge end of the main passageway for restricting the flow of pressurized gas.

7. An applicator according to claim 3 and having a baffle with a centrally located aperture at the discharge end of the main passageway.

8. An applicator for applying solder to the side seams of moving can bodies having a main passageway terminating at a discharge end, a solder nozzle located in the main passageway and having a discharge orifice spaced from the discharge end of said main passageway, said nozzle having a main body portion of lesser diameter than said main passageway and closely assembled to the walls of the main passageway below said main body portion thereby creating a space between the main body portion of the nozzle and the walls of the main passageway, a gas passageway communicating with said space at a location between the discharge orifice of the nozzle and its enlarged portion, said aperture having upwardly converging sidewalls, and means for introducing gas under pressure to said space to create an envelope of pressurized gas around the discharge orifice of the nozzle, solder discharged from said orifice, the baffle and discharge end of the solder passageway, said gaseous envelope forming a conduit through which discharge solder passes, the gaseous conduit being generally of the character of a nozzle at the baffle aperture.

9. An applicator according to claim 8 and having means for varying the pressure within said gaseous envelope to vary the size of the gaseous conduit to permit control of solder flow.

References Cited

UNITED STATES PATENTS 2,996,040   8/1961   Botinger.

RICHARD H. EANES, JR., *Primary Examiner.*